(12) United States Patent
Yoshida et al.

(10) Patent No.: US 10,006,420 B2
(45) Date of Patent: Jun. 26, 2018

(54) STORAGE TANK FOR LIQUEFIED FUEL (71) Applicant: MITSUBISHI HEAVY INDUSTRIES, LTD., Tokyo (JP)

(72) Inventors: Toyotaka Yoshida, Tokyo (JP); Kenji Nakamichi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 371 days.

(21) Appl. No.: 14/430,772

(22) PCT Filed: Oct. 11, 2013

(86) PCT No.: PCT/JP2013/077850
§ 371 (c)(1),
(2) Date: Mar. 24, 2015

(87) PCT Pub. No.: WO2014/061616
PCT Pub. Date: Apr. 24, 2014

(65) Prior Publication Data
US 2015/0292454 A1  Oct. 15, 2015

(30) Foreign Application Priority Data
Oct. 15, 2012  (JP) ................. 2012-228079

(51) Int. Cl.
*F17C 3/04* (2006.01)
*F02M 37/00* (2006.01)
(Continued)

(52) U.S. Cl.
CPC ......... *F02M 37/0076* (2013.01); *B64G 1/402* (2013.01); *F17C 3/04* (2013.01);
(Continued)

(58) Field of Classification Search
CPC ...... F17C 2223/0184; F17C 2223/0626; F17C 2205/0184; F17C 3/04; F17C 3/025; F17C 2260/033; F17C 2260/0366
See application file for complete search history.

(56) References Cited

U.S. PATENT DOCUMENTS 4,272,257 A   6/1981  Ellion et al.
4,821,907 A   4/1989  Castles et al.
(Continued)

FOREIGN PATENT DOCUMENTS

DE  10310319 A1 *  9/2004  ................ F17C 3/08
JP  1-80599  5/1989
(Continued)

OTHER PUBLICATIONS

JP08210598A Translation.*
(Continued)

*Primary Examiner* — Brian King
(74) *Attorney, Agent, or Firm* — Wenderoth, Lind & Ponack, L.L.P.

(57) ABSTRACT

A storage tank 10A has a heat insulating material layer 14 formed on the outer side of a partition wall 12 that has a container shape. The inside of the storage tank 10A is divided into two storage spaces $V_1$, $V_2$. The first storage space $V_1$ stores liquefied hydrogen $LH_2$ and the second storage space $V_2$ storing slush hydrogen $SH_2$. A plurality of fins 18 are disposed on the partition plate 16 so as to promote heat transfer between the liquefied hydrogen $LH_2$ and the slush hydrogen $SH_2$ and to reduce the amount of evaporation gas from the liquefied hydrogen $LH_2$. An escape pipe 20 is connected to the storage space $V_1$, and the fuel supply pipes 24*a*, 24*b* are connected to the storage spaces $V_1$, $V_2$, respectively. The fuel supply pipes 24*a*, 24*b* are connected to a combustor 26 via the main fuel pipe 24.

5 Claims, 6 Drawing Sheets (51) Int. Cl.
*F17C 13/00* (2006.01)
*B64G 1/40* (2006.01)
*F28D 15/02* (2006.01)

(52) U.S. Cl.
CPC ........ *F17C 13/008* (2013.01); *F28D 15/0275* (2013.01); *F17C 2201/0109* (2013.01); *F17C 2201/019* (2013.01); *F17C 2201/0185* (2013.01); *F17C 2201/054* (2013.01); *F17C 2201/056* (2013.01); *F17C 2221/012* (2013.01); *F17C 2223/0161* (2013.01); *F17C 2223/033* (2013.01); *F17C 2260/033* (2013.01); *F17C 2270/0194* (2013.01); *F17C 2270/0197* (2013.01); *Y02E 60/321* (2013.01)

(56) References Cited

U.S. PATENT DOCUMENTS

| | | | | |
|---|---|---|---|---|
| 2004/0182869 | A1* | 9/2004 | Kubo | F17C 1/00 220/581 |
| 2007/0193282 | A1* | 8/2007 | Grayson | F17C 3/10 62/45.1 |

FOREIGN PATENT DOCUMENTS

| | | | | |
|---|---|---|---|---|
| JP | 7-257497 | 10/1995 | | |
| JP | 8-85500 | 4/1996 | | |
| JP | 8-210598 | 8/1996 | | |
| JP | 08210598 A | * | 8/1996 | ............ B64G 1/402 |
| JP | 2002-227722 | 8/2002 | | |
| JP | 3416731 | 6/2003 | | |
| JP | 2005-155536 | 6/2005 | | |
| JP | 2008-267503 | 11/2008 | | |
| JP | 2011-173743 | 9/2011 | | |
| JP | 4939289 | 5/2012 | | |

OTHER PUBLICATIONS

JPH08210698 Translation.*
DE10310319A1 Translation.*
JP2008267503 Translation.*
International Preliminary Report on Patentability dated Apr. 21, 2015, in International Application No. PCT/JP2013/077850.
International Search Report dated Jan. 7, 2014, in International Application No. PCT/JP2013/077850.

* cited by examiner

STORAGE TANK FOR LIQUEFIED FUEL

TECHNICAL FIELD

The present invention relates to a liquefied-fuel storage tank whereby an amount of evaporation gas from stored liquefied-fuel can be reduced.

BACKGROUND

While liquefied hydrogen has a high energy density, it is an extremely low-temperature fuel (having a boiling point of 20.3 K at the atmosphere pressure), which results in a property of easily evaporating under the influence of the external environment (temperature difference, heat input from sunlight, etc.). Thus, storing such a fuel for a long period of time may lead to a decrease in the usable amount corresponding to the amount of evaporation, even if a large amount of the fuel has been initially stored. For a rocket used to launch a satellite or the like in which the fuel may be ignited again some time after the launch, in particular, a measure for reducing evaporation until the next ignition is required. As such a measure, one may consider reducing heat input from e.g. radiation heat from sunlight by covering the surface of the body of the rocket with a foaming heat insulating material. However, this measure alone may not be possible to reduce the amount of evaporation gas over a longtime storage by itself, because of the limit for reducing the amount of heat input from radiation heat.

Patent Document 1 discloses a storage tank that stores liquefied fluid for reducing generation of evaporation gas. The storage tank has a partition wall being a double wall between which a vacuum heat insulating space is formed, so as to shut heat penetration and reduce the amount of evaporation gas. Further, a liquid phase and a solid phase of the liquefied fuel are formed in a storage space, so that heat penetrating into the storage space is absorbed by melting heat of the solid phase, and heat input to the liquid phase is prevented to reduce the amount of evaporation gas.

CITATION LIST

Patent Literature

Patent Document 1: Japanese Patent No. 4939289

SUMMARY

Technical Problem

If a partition wall of a storage tank is a double wall that forms a heat insulating space, the capacity and weight of the storage tank increases. Thus, in a case where such a storage tank is mounted to a rocket, it is necessary to consider reducing the capacity and weight of the storage tank. Further, a storage tank mounted to a rocket is rotated about the center of the tank in the outer space. The reason for this is to prevent an extreme temperature difference from being produced on the tank surface by making the tank surface receive light evenly. As a result, centrifugal force due to the rotation is applied to the storage tank from the center toward the side wall.

In the storage tank described in Patent Document 1, the liquid phase and the solid phase of the liquefied fuel are not completely separated in the tank but stored in a state where the liquid phase can freely flow to the solid phase. Thus, natural convection is likely to occur throughout the entire storage space between the liquid phase and the solid phase due to the above centrifugal force. This large convection may promote heat transfer and increase an amount of heat that penetrates into the tank from outside.

In view of the issues of the above conventional technique, an object of the present invention is to reduce the amount of evaporation gas from the stored liquefied fuel further, while restricting an increase in the capacity and weight of the storage tank.

Solution to Problem

In order to achieve the above object, a liquefied-fuel storage tank according to the first aspect of the present invention includes: a partition wall of a container shape forming a storage space inside; a heat insulating material layer formed on the partition wall; a partition wall dividing the storage space into a first storage space and a second storage space, the first storage space storing liquefied fuel and the second storage space storing slush fuel which has a lower temperature than the liquefied fuel and which includes a mixture of a solid phase and a liquid phase; a heat transfer unit disposed on the partition wall, the heat transfer unit being configured to promote heat transfer between the liquefied fuel and the slush fuel; an outlet for discharging evaporation gas in the first storage space when a pressure of the first storage space reaches a setting pressure; and a fuel supply system for supplying the liquefied fuel from each of the first storage space and the second storage space to a combustor.

The heat insulating material layer formed on the partition wall of the tank includes, for instance, a radiation heat insulating material, or a foaming heat insulating material obtained by foam molding of rigid urethane or polystyrene. This heat insulating material layer shuts off radiation heat from sunlight or reflection light from the earth. Slush fuel is a fuel including liquefied fuel and solidified fuel mixed like sherbet. Further, flow between the first storage space storing the liquefied fuel and the second storage space storing the slush fuel is shut off by a partition wall, so that the liquefied fuel and the slush fuel exchange heat via the heat transfer unit. Thus, heat penetrating into the storage space is absorbed by the melting heat of the slush fuel. As described above, utilizing the cold of the slush fuel makes it possible to reduce the amount of evaporation gas from the liquefied fuel without requiring an additional refrigerating device or the like.

In the first aspect of the present invention, flow between the liquefied fuel and the slush fuel is shut off by the partition wall, which makes it possible to restrict natural convection that prevails in the entire storage space. Thus, heat transfer to and from the outside is restricted, which makes it possible to reduce the amount of evaporation gas. Further, the vaporized fuel is discharged from the outlet to decrease the pressure of the first storage space to the setting pressure or less when the amount of evaporation from the liquefied fuel increases and the pressure of the first storage space reaches the setting pressure. In this way it is possible to maintain the pressure in the first storage space at the setting pressure or less. Further, the liquefied fuel having melted in the first storage space and the second storage space is supplied to the combustor via the fuel supply system, which makes it possible to effectively use the liquefied fuel having melted in the second storage space as fuel.

The heat transfer unit may include a plurality of fins mounted to the partition wall so as to protrude into the first storage space and the second storage space. In this way, it is possible to provide a simplified heat transfer unit at low cost.

The heat transfer promoting unit may include a heat pipe mounted to the partition wall, the heat pipe including a cooling part disposed in the first storage space and a heating part disposed in the second storage space. In this way, it is possible to promote heat exchange between the liquefied fuel and the slush fuel, and to enhance the cooling effect for the liquefied fuel.

Further, a container which forms the second storage space may be disposed in the storage space so that an entire periphery of the container is surrounded by the first storage space, and the heat transfer unit may be disposed on a partition wall of the container. In this way, the amount of heat absorbed by the slush fuel is entirely absorbed from the liquefied fuel, which makes it possible to enhance the cooling effect for the liquefied fuel. It is also possible to enlarge the space for installing the heat transfer unit, which makes it possible to enhance the flexibility of layout for the heat transfer unit.

A liquefied-fuel storage tank according to the second aspect of the present invention includes: a partition wall of a container shape forming a storage space inside, at least a part of the partition wall having a double wall; a filling space formed between the double wall and filled with an adsorption cooling medium configured to adsorb a low-boiling medium while involving an exothermic reaction and to discharge the low-boiling medium while involving an endothermic reaction; a communication mechanism configured to bring the filling space into communication with an external space in accordance with a pressure of the external space; an outlet configured to discharge evaporation gas in the storage space when a pressure of the storage space reaches a setting pressure; and a fuel supply system configured to supply liquefied fuel from the storage space to a combustor.

In the second aspect of the present invention, when the pressure of the external space decreases, the filling space filled with the adsorption cooling medium is brought into communication with the external space so as to reduce the pressure inside the filling space. In this way, the low-boiling medium adsorbed to the adsorption cooling medium is separated from the adsorption cooling medium. As a result, an endothermic reaction occurs when the low-boiling medium adsorbed to the adsorption cooling medium is discharged, which makes it possible to cool the liquefied fuel and to absorb heat that is about to enter the storage space. As described above, the endothermic reaction of the adsorption cooling medium is utilized, which makes it possible to reduce the amount of evaporation gas from the liquefied fuel without requiring an additional refrigerating device or the like. Further, if the pressure of the filling space is decreased to a low pressure close to vacuum after the low-boiling medium adsorbed to the adsorption cooling medium is entirely discharged, it is possible to secure a heat insulating property to a certain extent with the filling space against the heat input to the storage tank.

Here, since the evaporation gas is discharged from the outlet to decrease the pressure of the storage space to the setting pressure or less when the amount of evaporation from the liquefied fuel increases and the pressure in the first storage space reaches the setting pressure, it is possible to restrict the pressure in the storage space to a tolerance pressure or less. Further, the liquefied fuel having liquefied fuel in the storage space is supplied to the combustor via the fuel supply system.

In the second aspect of the present invention, a heat insulating material layer may be formed around the double wall so as to surround the storage space. In this way, it is possible to enhance the cooling effect for the liquefied fuel stored in the storage space from the synergy of the cooling effect of the adsorption cooling medium and the heat insulating effect of the heat insulating material. Moreover, if the heat insulating material layer is disposed on the inner side of the double wall, the heat insulating material layer would not interrupt attachment of a communication mechanism to the double wall, which facilitates attachment of the communication mechanism. Further, if the heat insulating material layer is disposed on the outer side of the double wall, there would be no intervening object between the adsorption cooling medium and the liquefied fuel, which makes it possible to promote heat transfer between the adsorption cooling medium and the liquefied fuel, and to enhance the cooling effect for the liquefied fuel due to the endothermic reaction of the adsorption cooling medium. Further, if the heat insulating material layer is disposed on each side of the double wall, it is possible to enhance the heat insulating effect remarkably.

Furthermore, carbon nanotubes may be used as the adsorption cooling medium. Using carbon nanotubes having a heat insulating property makes it possible to achieve a long product lifetime even in the outer space, into which strong radiation heat is emitted.

Advantageous Effects

According to the first and second aspects of the present invention, it is possible to reduce the amount of evaporation gas from the stored liquefied fuel effectively while restricting an increase in the weight of the partition wall forming the storage tank. Further, the slush hydrogen, which has been used a cold source and melted by heat absorption, can be utilized directly as fuel.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

Embodiment 1

Figure 1:
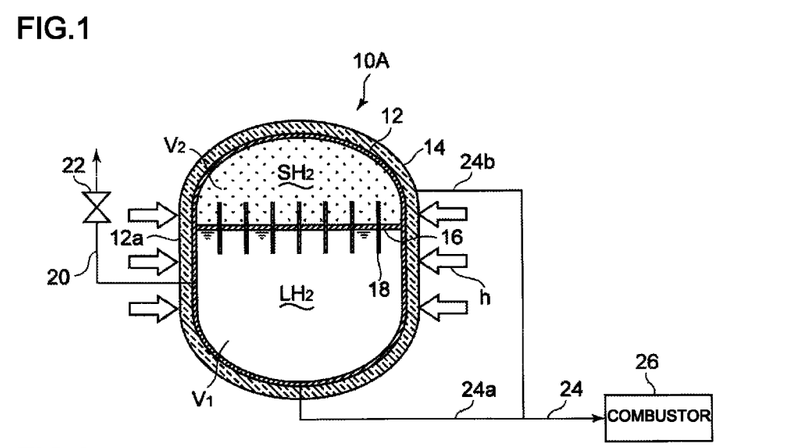
FIG. 1 is a front cross-sectional view of a storage tank according to the first embodiment of the first aspect of the present invention.

Now, the first embodiment of the first aspect of the present invention will be described with reference to FIG. 1. The first embodiment is applied to a storage tank for storing liquefied hydrogen. The storage tank 10A of the present embodiment is mounted to a rocket for launching a satellite or the like. The storage tank 10 includes a partition wall 12 of a container shape. A heat insulating material layer 14 is formed on the outer surface of the partition wall 12. The heat insulating material layer 14 includes, for instance, a heat insulating material such as a radiation heat insulating material and a foaming heat insulating material obtained by foam molding of rigid urethane or polystyrene. The inside of the storage tank 10A is partitioned by a partition plate 16 that has a flat shape and is made from steel, so as to be divided in half.

Liquefied hydrogen $LH_2$ is stored in a storage space $V_1$ formed at one side of the partition plate 18, while slush hydrogen (hydrogen including liquefied hydrogen and solidified hydrogen mixed like sherbet) $SH_2$ is stored in a storage space $V_2$ formed on the other side of the partition plate 16. The liquefied hydrogen $LH_2$ has a temperature of 20K, while the slush hydrogen $SH_2$ has a temperature of 13K. A plurality of fins 18 is mounted over the entire region of the partition plate 16. The fins 18 are spaced from one another and arranged in a direction such that the fins 18 protrude into the storage spaces $V_1$ and $V_2$.

An escape pipe 20 communicating with the storage space $V_1$ is connected to the partition wall 12 forming the storage space $V_1$. The escape pipe 20 includes a safety valve 22 for opening the escape pipe 20 when the pressure of the storage space $V_1$ reaches a setting pressure. The side surface 12a of the partition wall 12 of the storage tank 10 is directly exposed to the outer space. Thus, the side wall 12a of the partition wall 12 is mainly exposed to sunlight and reflection light from the earth, which results in inward penetration of radiation heat "h". Fuel supply pipes 24a and 24b are connected to the storage spaces $V_1$ and $V_2$, respectively, and to a combustor 26 of the rocket via a main fuel pipe 24.

In the above configuration, the slush hydrogen $SH_2$, which has a lower temperature than the liquefied hydrogen $LH_2$, exchanges heat with the liquefied hydrogen $LH_2$ via the fins 18, thereby cooling the liquefied hydrogen $LH_2$. Thus, heat having penetrated into the storage space $V_1$ transfers to the slush hydrogen $SH_2$ via the liquefied hydrogen $LH_2$, so as to be used as latent heat of fusion of the slush hydrogen $SH_2$. In this way, it is possible to reduce an amount of evaporation gas from the liquefied hydrogen $LH_2$. The slush hydrogen $SH_2$ having melted in the storage space $V_2$ is supplied to the combustor 26, and can be used as fuel. Here, if the amount of evaporation of the liquefied hydrogen $LH_2$ in the storage space $V_1$ increases and the pressure of the storage space $V_1$ rises to a setting pressure, the safety valve 22 opens to discharge the evaporation gas, which makes it possible to decrease the pressure of the storage space $V_1$ to the setting pressure or less.

According to the present embodiment, heat transfer between the liquefied hydrogen $LH_2$ and the slush hydrogen $SH_2$ is promoted by the fins 18, which makes it possible to reduce the amount of evaporation gas from the liquefied hydrogen $LH_2$. Further, flow between the storage space $V_1$ and the storage space $V_2$ is shut off by the partition plate 16, which prevents natural convection that prevails in the entire storage space. As a result, the amount of heat transferring to the liquefied hydrogen $LH_2$ is restricted, which makes it possible to reduce the amount of evaporation gas in the storage space $V_1$. As described above, the cold of the slush hydrogen $SH_2$ is utilized, which makes it possible to reduce the amount of evaporation gas from the liquefied hydrogen $LH_2$ without requiring an additional refrigerating device or the like. Moreover, since the fins 18 are provided to transfer heat between the liquefied hydrogen $LH_2$ and the slush hydrogen $SH_2$, it is possible to transfer heat easily and at low cost.

Embodiment 2

Figure 2:
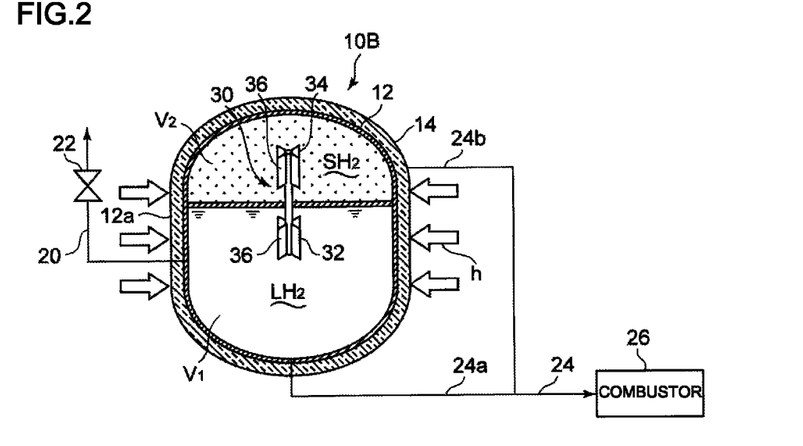
FIG. 2 is a front cross-sectional view of a storage tank according to the second embodiment of the first aspect of the present invention.

Next, the second embodiment of the first aspect of the present invention will be described with reference to FIG. 2. A storage tank V10B is mounted to a rocket, similarly to the above storage tank 10A. The storage tank 10B employs a heat pipe 30 as a heat transfer unit. The heat pipe 30 includes a hollow pipe through which working fluid flows. As working fluid, for instance, high-carbon ammonia solution is used. A heating part 32 for absorbing heat from the liquefied hydrogen $LH_2$ is disposed in the storage space $V_1$, while a cooling part 34 for discharging heat to the slush hydrogen $SH_2$ is disposed in the storage space $V_2$. Each of the heating part 32 and the cooling part 34 includes a plurality of fins 36 for promoting heat transfer. Other configuration is identical to that of the first embodiment, and a common component is associated with a common reference sign, in accordance with the above description.

The working fluid in the heat pipe 30 absorbs heat from the liquefied hydrogen $LH_2$ and evaporates at the heating part 32. The vaporized working fluid shifts to the cooling part 34, and heats the slush hydrogen $SH_2$ and condenses at the cooling part 34. The condensed working fluid shifts to the heating part 32. According to the present embodiment, providing the heat pipe 30 promotes heat transfer between the liquefied hydrogen $LH_2$ and the slush hydrogen $SH_2$, which makes it possible to enhance the cooling effect for the liquefied hydrogen $LH_2$ (see Japanese Patent No. 3416731 for details of the heat pipe 30).

Embodiment 3

Figure 3:
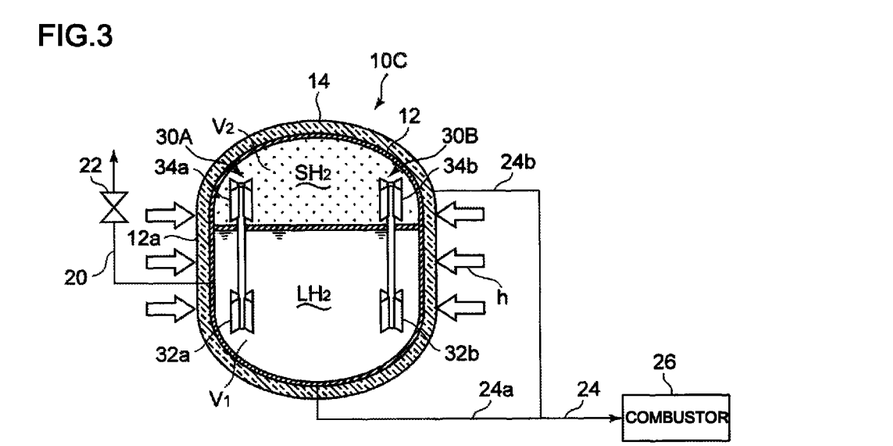
FIG. 3 is a front cross-sectional view of a storage tank according to the third embodiment of the first aspect of the present invention.

Next, the third embodiment of the first aspect of the present invention will be described with reference to FIG. 3. The present embodiment is different from the second embodiment in that a storage tank 10C includes two or more heat pipes 30A, 30B. Each of the heat pipes 30A, 30B has the same configuration as that of the heat pipe 30 in the second embodiment. That is, heating parts 32a, 32b are disposed in the storage space $V_1$ and cooling parts 34a, 34b are disposed in the storage space $V_2$. The heat pipes 30A, 30B are disposed at the vicinity of the inner side of the side wall 12a. While FIG. 3 illustrates two heat pipes 30A, 30B, three or more heat pipes may be arranged in the circumferential direction. Other configuration is identical to that of the first embodiment.

According to the present embodiment, the plurality of heat pipes 30A, 30B is disposed in the vicinity of the inner side of the side wall 12a, through which a large amount of heat penetrates. In this way, it is possible to increase the amount of heat absorption by the heat pipes 30A, 30B with respect to the amount of heat penetration. Thus, it is possible to reduce the amount of evaporation gas from the liquefied hydrogen $LH_2$.

Embodiment 4

Figure 4:
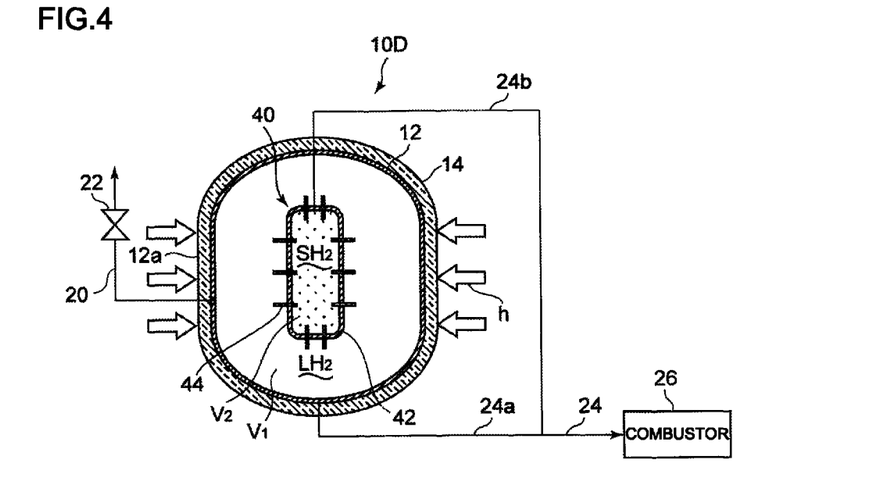
FIG. 4 is a front cross-sectional view of a storage tank according to the fourth embodiment of the first aspect of the present invention.

Next, the fourth embodiment of the first aspect of the present invention will be described with reference to FIG. 4. A storage tank 10D of the present embodiment includes a container 40 of a sealed shape disposed in the storage space $V_1$ filled with the liquefied hydrogen $LH_2$. The inside of the container 40 forms the storage space $V_2$ filled with the slush hydrogen $SH_2$ The partition wall 42 of the container 40 includes a plurality of fins 44 for promoting heat transfer between the liquefied hydrogen $LH_2$ and the slush hydrogen $SH_2$, arranged at certain intervals over the entire surface of the partition wall 42. The fuel supply pipe 24b is connected to the container 40, and to the main fuel pipe 24 through the storage space $V_1$. Other configuration is identical to that of the first embodiment.

According to the present embodiment, the amount of heat absorbed by the slush hydrogen $SH_2$ is to be entirely absorbed from the liquefied hydrogen $LH_2$, which makes it possible to enhance the cooling effect for the liquefied hydrogen $LH_2$. Thus, it is possible to reduce the amount of evaporation gas from the liquefied hydrogen $LH_2$. Further, it is possible to ensure a wide space for disposing the fins 44, which makes it possible to improve the flexibility of layout for the fins 44, and to increase the amount of heat transfer by providing a number of fins 44.

Embodiment 5

Figure 5:
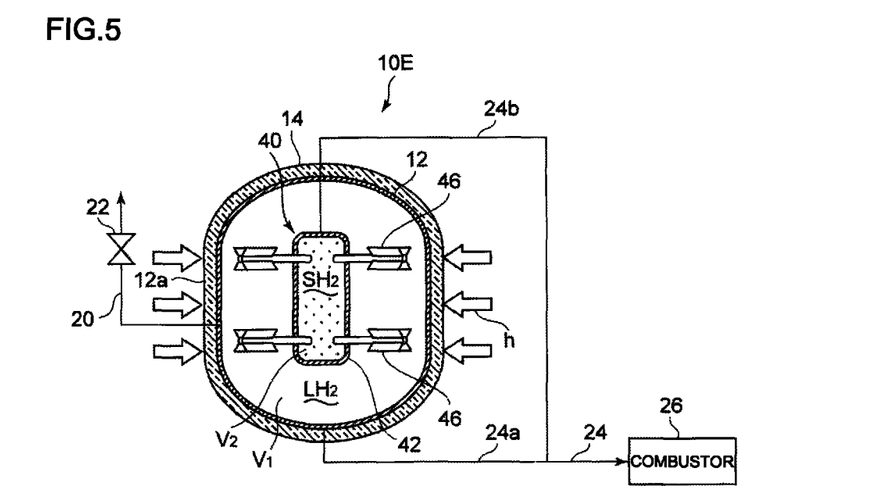
FIG. 5 is a front cross-sectional view of a storage tank according to the fifth embodiment of the first aspect of the present invention.

Next, the fifth embodiment of the first aspect of the present invention will be described with reference to FIG. 5. A storage tank 10E according to the present embodiment is different from the storage tank 10D in the fourth embodiment in that it includes a plurality of heat pipes 46 as a heat transfer unit, instead of the fins 44. That is, a plurality of heat pipes 46 is disposed on the partition wall 42 of the tank 40, with the heating parts of the heat pipes 46 disposed in the storage space $V_1$ and the cooling parts of the heat pipes 46 disposed in the storage space $V_2$. Other configuration is identical to that of the fourth embodiment.

According to the present embodiment, it is possible to ensure a wide space for disposing the plurality of heat pipes 46, and thus to improve the flexibility of layout of the heat pipes 46. Further, providing the plurality of heat pipes 46 enhances the cooling effect for the liquefied hydrogen $LH_2$, which makes it possible to reduce the amount of evaporation gas from the liquefied hydrogen $LH_2$.

Embodiment 6

Figure 6:
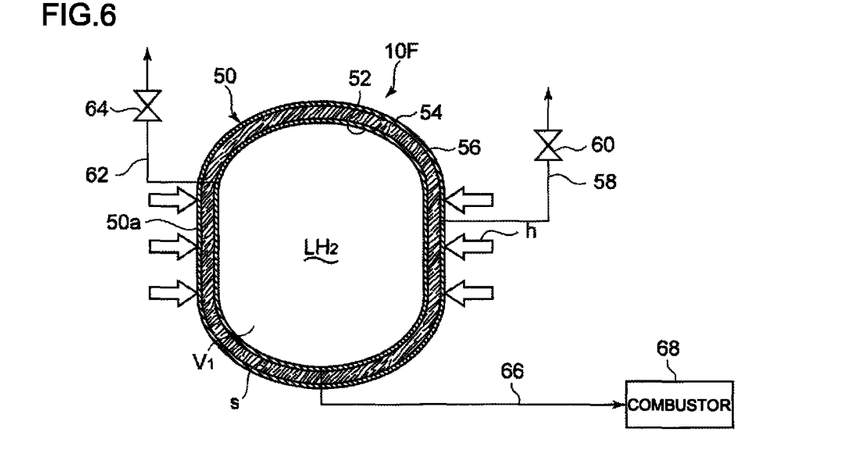
FIG. 6 is a front cross-sectional view of a storage tank according to the first embodiment of the second aspect of the present invention.
Figure 7:
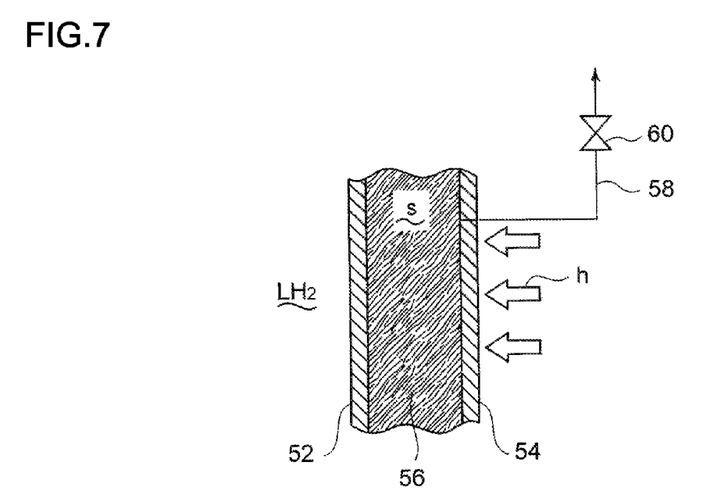
FIG. 7 is a partial enlarged cross-sectional view of the storage tank in FIG. 6.

Next, the first embodiment of the second aspect of the present invention will be described with reference to FIGS. 6 and 7. With reference to FIG. 6, a storage tank 10F of the present embodiment is to be mounted to a rocket for launching a satellite or the like. The partition wall 50 of the storage tank 10F includes a double wall including an inner wall 52 and an outer wall 54. Further, a filling space "s" is formed between the inner wall 52 and the outer wall 54, and filled with carbon nanotubes 56. A pipe 58 is connected to the filling space "s". The pipe 58 includes a pressure-adjustment valve 60 for opening the pipe 58 when the differential pressure between the filling space "s" and the external space rises to a setting pressure or more.

The storage space $V_1$ formed inside the partition wall 50 stores the liquefied hydrogen $LH_2$. An escape pipe 62 communicating to the storage space $V_1$ is connected to the partition wall 52. The escape pipe 62 includes a safety valve 64 for opening the escape pipe 62 when the differential pressure between the storage space $V_1$ and the external space reaches the setting pressure or more. The side wall 50a of the partition wall 50 is directly exposed to the external environment. Thus, the side wall 50a is mainly exposed to sunlight and reflection light from the earth, which results in inward penetration of radiation heat "h". A fuel supply pipe 66 is connected to the storage space $V_1$. The fuel supply pipe 66 is also connected to the combustor 68 of the rocket to supply the liquefied hydrogen $LH_2$ to the combustor 68.

The carbon nanotubes 56 adsorb and store in advance a low-boiling medium that has a boiling point equivalent to or less than that of the liquefied hydrogen $LH_2$, such as hydrogen and helium. When the rocket travels the outer space and the differential pressure between the filling space "s" and the external space reaches the setting pressure or more, the pressure-adjustment valve 60 opens. Once the pressure-adjustment valve 60 opens and the pressure inside the filling space "s" decreases, the low-boiling medium adsorbed and stored in the carbon nanotubes 56 separates from the carbon nanotubes 56. Separation of the low-boiling medium involves an endothermic reaction, and thereby the liquefied hydrogen $LH_2$ stored in the storage space $V_1$ is cooled.

According to the present embodiment, when the differential pressure between the filling space "s" and the external space reaches the setting pressure or more, the escape pipe 62 is automatically opened to cause an endothermic reaction, which makes it possible to cool the liquefied hydrogen $LH_2$ in the storage space $V_1$. Thus, it is possible to absorb the radiation heat "h" that is to about to penetrate into the storage space $V_1$. As described above, the endothermic reaction of the carbon nanotubes 56 is utilized, which makes it possible to reduce the amount of evaporation gas from the liquefied hydrogen $LH_2$ without providing an additional refrigerating device or the like. Further, when the pressure-adjustment valve 60 is opened and the low-boiling medium is completely discharged, the filling space "s" becomes a vacuum similar to the outer space, which makes it possible to secure a heat insulating property to a certain extent with the filling space "s" against the heat penetrating into the storage tank 10F. Alternatively, in the present embodiment, the pressure-adjustment valve 60 may be controlled to open and close by a control device.

Embodiment 7

Figure 8:
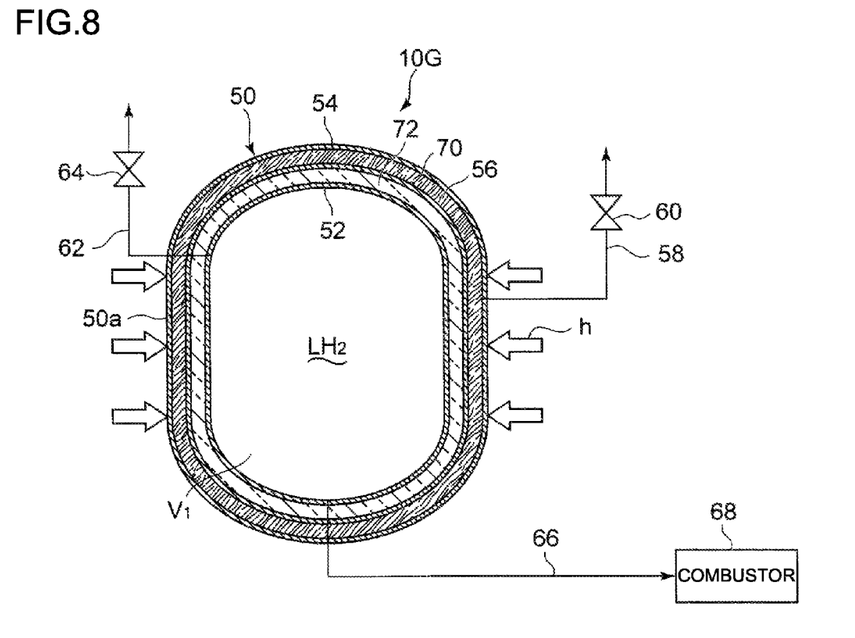
FIG. 8 is a front cross-sectional view of a storage tank according to the second embodiment of the second aspect of the present invention.
Figure 9:
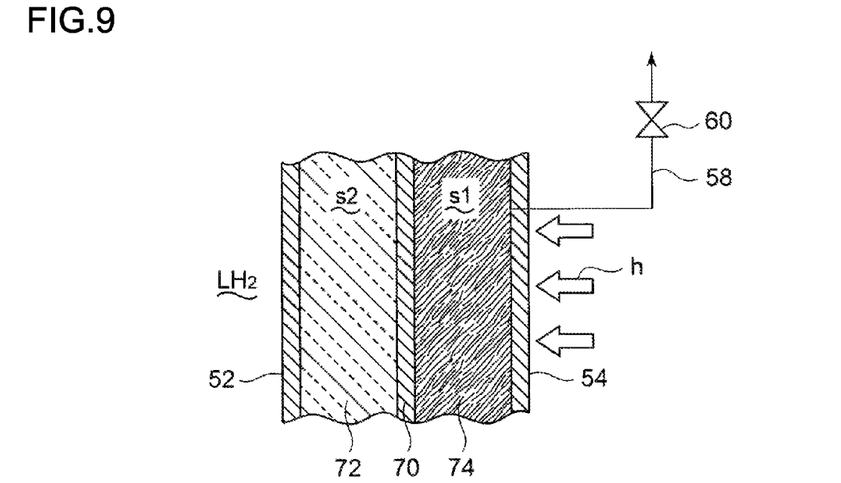
FIG. 9 is a partial enlarged cross-sectional view of the storage tank in FIG. 8.

Next, the second embodiment of the second aspect of the present invention will be described with reference to FIGS. 8 and 9. The partition wall 50 of a storage tank 10G of the present embodiment includes an intermediate wall 70 made from metal between the inner wall 52 and the outer wall 54. A filling space "s1" formed between the outer wall 54 and the intermediate wall 70 is filled with the carbon nanotubes 56, and a filling space "s2" formed between the inner wall 52 and the intermediate wall 70 forms a heat insulating material layer 72 including a radiation heat insulating material. Other configuration is identical to that of the first embodiment.

According to the present embodiment, the cooling effect of the carbon nanotubes 56 and the heat insulating effect of the heat insulating material layer 72 improve the cold-keeping effect for the liquefied hydrogen $LH_2$ in synergy, which makes it possible to further reduce the amount of evaporation gas in the storage space $V_1$. Further, providing the heat insulating material layer 72 inside the filling space "s1" facilitates layout of the pipe 58.

Embodiment 8

Figure 10:
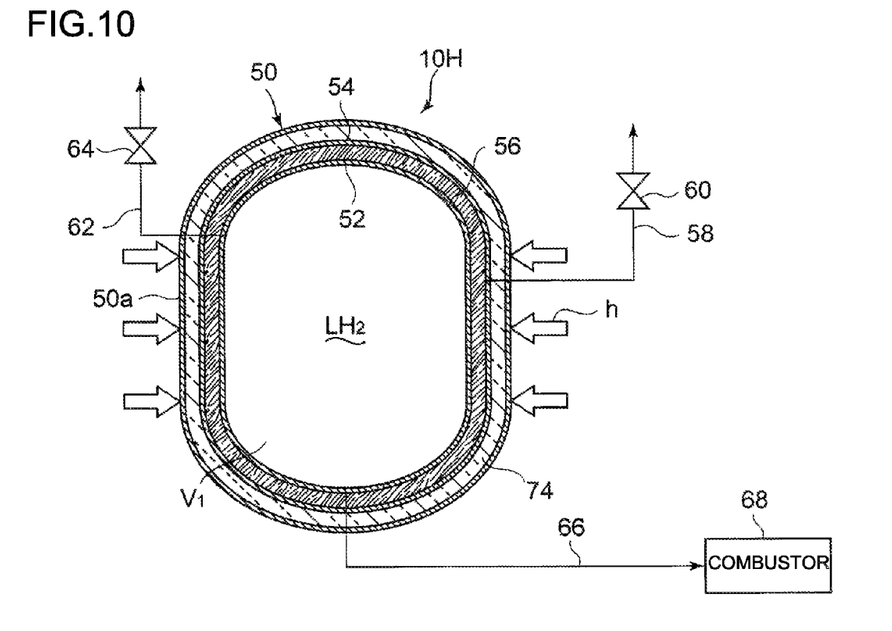
FIG. 10 is a front cross-sectional view of a storage tank according to the third embodiment of the second aspect of the present invention.

Next, the third embodiment of the second aspect of the present invention will be described with reference to FIG. 10. The partition wall 50 of a storage tank 10H of the present embodiment is different from that of the first embodiment of FIGS. 6 and 7 in that it includes a heat insulating material layer 74 including a radiation heat insulating material at the outer side of the outer wall 54. Other configuration is identical to that of the first embodiment. In the present embodiment, similarly to the first embodiment, the cooling effect of the carbon nanotubes 56 is achieved, and further, it is possible to enhance the cold-keeping effect for the liquefied hydrogen $LH_2$ from the synergy of the above cooling effect and the heat insulating effect obtained by the heat insulating material layer 74, which makes it possible to reduce the amount of evaporation gas in the storage space $V_1$. Moreover, since the heat insulating material layer 74 is disposed on the outer side of the carbon nanotubes 56, there is no intervening object between the carbon nanotubes 56 and the liquefied hydrogen $LH_2$, which makes it possible to promote heat transfer between the carbon nanotubes 56 and the liquefied hydrogen $LH_2$.

Embodiment 9

Figure 11:
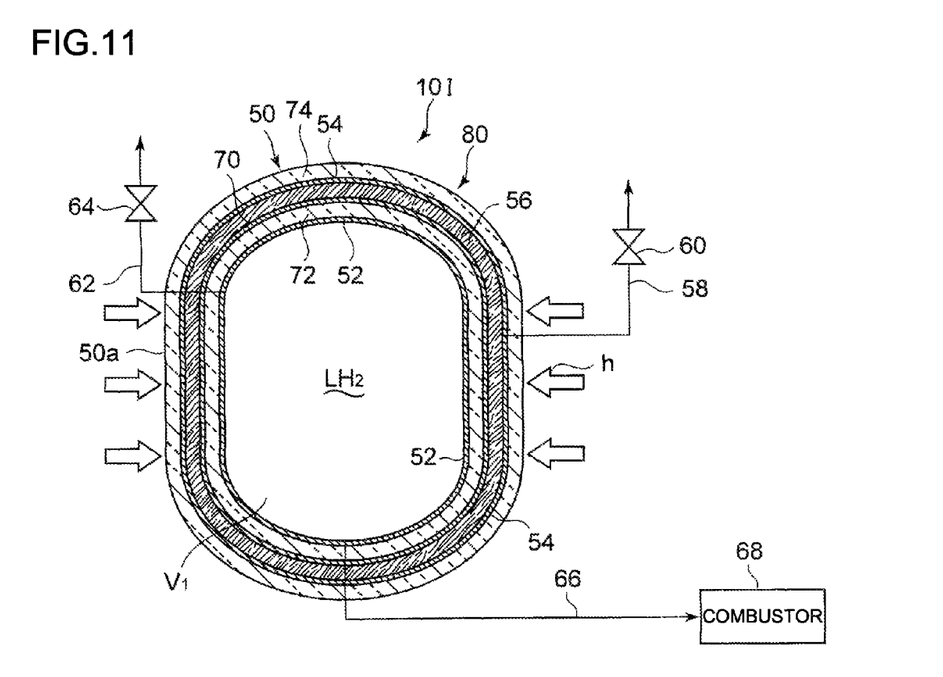
FIG. 11 is a front cross-sectional view of a storage tank according to the fourth embodiment of the second aspect of the present invention.

Next, the fourth embodiment of the second aspect of the present invention will be described with reference to FIG. 11. A storage tank 10I of the present embodiment includes the first intermediate wall 70 disposed between the inner wall 52 and the outer wall 54, both of which are made from steel. Further, the filling space formed between the inner wall 52 and the first intermediate wall 70 is filled with the heat insulating material layer 72 including a radiation heat insulating material, while the filling space formed between the first intermediate wall 70 and the outer wall 54 is filled with the carbon nanotubes 56. Furthermore, a heat insulating material layer 74 including a radiation heat insulating material is formed on the outer surface of the outer wall 54. Other configuration is identical to that of the third embodiment.

According to the present invention, since the heat insulating material layers 72, 74 each including a radiation heat insulating material are formed on the inner side and the outer side of the carbon nanotubes 56, respectively, it is possible to enhance the heat insulating effect remarkably as compared to the second embodiment and the third embodiment. Thus, it is possible to further reduce the amount of evaporation gas in the storage space $V_1$ from the synergy of the two heat insulating material layers and the carbon nanotubes 56.

INDUSTRIAL APPLICABILITY

According to the first and second aspects of the present invention, it is possible to provide a storage tank whereby it is possible to reduce the amount of evaporation gas from the low-temperature liquefied fuel stored in the storage tank, while restricting an increase in the weight of the storage tank.

REFERENCE SIGNS LIST 10A to 10I Storage tank
12, 42, 50 Partition wall
12a, 50a Side wall
14, 72, 74 Heat insulating material layer
16 Partition plate
18, 36, 44 Fin
20, 62 Escape pipe
22, 64 Safety valve
24 Main fuel pipe
24a, 24b, 66 Fuel supply pipe
26, 68 Combustor
30, 30A, 30B, 46 Heat pipe
32 Heating part
34 Cooling part
40 Container
52 Inner wall
54 Outer wall
56 Carbon nanotube
58 pipe
60 Pressure-adjustment valve
70 Intermediate wall
$LH_2$ Liquefied hydrogen
$SH_2$ Slush hydrogen
$V_1$ Storage space (first storage space)
$V_2$ Storage space (second storage space)
s, s1, s2 Filling space

The invention claimed is:

1. A liquefied-fuel storage tank, comprising:
a partition wall of a container shape forming a storage space inside;
a heat insulating material layer formed on the partition wall;
a partition plate dividing the storage space into a first storage space and a second storage space, the first storage space storing liquefied fuel and the second storage space storing slush fuel which has a lower temperature than the liquefied fuel and which includes a mixture of a solid phase fuel and a liquid phase fuel;
a heat transfer unit disposed on the partition plate, the heat transfer unit being configured to promote heat transfer between the liquefied fuel and the slush fuel;
an outlet for discharging evaporation gas in the first storage space when a pressure of the first storage space reaches a setting pressure; and
a fuel supply system for supplying the liquefied fuel from the first storage space and the liquid phase fuel from the second storage space to a combustor,
wherein the partition plate is configured to shut off a flow of the liquefied fuel from the first storage space to the second storage space, and
wherein the partition plate is further configured to shut off a flow of the slush fuel from the second storage space to the first storage space.

2. The liquefied-fuel storage tank according to claim 1, wherein the heat transfer unit includes a plurality of fins mounted to the partition plate so as to protrude into the first storage space and the second storage space.

3. The liquefied-fuel storage tank according to claim 1, wherein the heat transfer promoting unit includes a heat pipe mounted to the partition plate, the heat pipe including a working-fluid heating part disposed in the first storage space and a working-fluid cooling part disposed in the second storage space.

4. The liquefied-fuel storage tank according to claim 1, wherein a container which is formed by the partition plate and forms the second storage space is disposed in the storage space so that an entire periphery of the container is surrounded by the first storage space, and wherein the heat transfer unit is disposed on the partition plate which forms the container.

5. A liquefied-fuel storage tank, comprising:

a partition wall of a container shape forming a storage space inside;

a heat insulating material layer formed on the partition wall;

a partition plate dividing the storage space into a first storage space and a second storage space, the first storage space storing liquefied fuel and the second storage space storing slush fuel which has a lower temperature than the liquefied fuel and which includes a mixture of a solid phase fuel and a liquid phase fuel;

a heat transfer unit disposed on the partition plate, the heat transfer unit being configured to promote heat transfer between the liquefied fuel and the slush fuel;

an outlet for discharging evaporation gas in the first storage space when a pressure of the first storage space reaches a setting pressure; and a fuel supply system for supplying the liquefied fuel from the first storage space and the liquid phase fuel from the second storage space to a combustor, wherein a container which is formed by the partition plate and forms the second storage space is disposed in the storage space so that an entire periphery of the container is surrounded by the first storage space, and wherein the heat transfer unit is disposed on the partition plate which forms the container.

* * * * *